Patented Mar. 21, 1950

2,500,950

UNITED STATES PATENT OFFICE 2,500,950

UNGELATINIZED STARCH ETHERS FROM POLYFUNCTIONAL ETHERIFYING AGENTS

Moses Konigsberg, New York, N. Y., assignor to National Starch Products Inc., New York, N. Y., a corporation of Delaware No Drawing. Application December 29, 1945, Serial No. 638,459

11 Claims. (Cl. 260—209)

This invention relates to the manufacture of a modified starch which has been termed an "inhibited" starch.

By an "inhibited" starch is meant herein a starch in which the disintegration of the starch granules in water is retarded under conditions where the starch granules ordinarily would swell and burst. The bursting and dispersal of the starch granules in aqueous suspension (whether caused by heat or by the action of chemicals such as alkalis) is commonly known as gelatinization.

In U. S. Patent 2,317,752 of Arthur D. Fuller, patented April 27, 1943, there is described a process of inhibiting starch by oxidation in the presence of certain inhibiting agents. By that process it is possible, for example, to transform a starch such as tapioca (which when cooked with water would ordinarily produce a rubbery cohesive mass) into a product which upon cooking in water yields a relatively non-cohesive, salve-like paste. This non-cohesiveness is caused by the fact that the disintegration of the starch granules has been retarded or inhibited, and the starch exists in the form of discreet granules within the aqueous cooked mass.

The object of the present invention similarly is to treat the unburst or ungelatinized starch granules so that when mixed with water (and subjected to normal gelatinizing conditions) the bursting of the granules will be inhibited and the resultant product will be non-cohesive relatively to the corresponding untreated starch. The degree of inhibition can be controlled and varied over a wide range so as to produce a starch product in which the swelling of the granules is only slightly retarded, and through successive stages to a starch product in which the swelling of the granules is so highly retarded that it cannot remain suspended in water and drops out as a separate phase.

A further object of my invention is the production of an inhibited starch product which is resistant to alkali. Previous methods of inhibition, such as that disclosed in said U. S. Patent 2,317,752 result in products which upon cooking in the presence of alkalis lose their inhibited qualities and revert to the relatively cohesive, completely gelatinized state of untreated cooked starch. My present invention results in the production of an inhibited starch which retains its distinctive characteristics even under alkaline conditions.

I have found that an "inhibited" starch of these properties may be produced by chemically reacting ungelatinized starch with an ether forming reagent. The reaction product is that formed from the reaction of the two reacting groups of the ether forming reagent with two hydroxyl groups of the starch.

The treatment of the starch with inhibition reagents, i. e. the reaction of the starch with the ether forming reagent, may take place in the dry or wet state, with or without application of heat. It may be emphasized that although the reaction may be carried out upon raw, unmodified starch or upon starch which has been modified by heat or chemical means, it must always take place upon a substantially ungelatinized starch, since the prime object of my invention is to retard or prevent the ultimate bursting (i. e., complete gelatinization) of the starch granules.

Examples of the inhibition reagents suitable for use in my process are ether forming aliphatic dihalides such as propylene dichloride, the dichloropentanes (ordinarily available in the form of commercial mixtures), ethylene dibromide, glycerol dichlorohydrin and dichlorobutane, and ether forming epoxy halogen compounds such as epichlorohydrin and epibromohydrin. When an ether forming aliphatic dihalide is used as the inhibition reagent, the two halogens of the aliphatic dihalide are reacted with the starch through two hydroxyl groups of the starch. When an epoxy halogen compound is used as the inhibition reagent, the halogen and the epoxy group of the epoxy halogen compound are reacted with the starch through the two hydroxyl groups of the starch.

It is preferred that the starch be alkaline during the reaction with the inhibition reagent, although the alkalinity must not be so great as to cause gelatinization of the starch. However, by means of the addition of gelatinization retardants such as sodium sulphate to the starch, gelatinization can be avoided even though the quantity of alkali present is considerably higher than that which would ordinarily result in gelatinization.

As will be evident from the examples, one method of practicing my invention is to suspend starch in water, add alkali and then add the inhibition reagent. Another method is by using a dry process, in which commercially dry starch is mixed with the alkaline material and the inhibition reagent, and these are allowed to react, preferably with heat, until the desired degree of modification has been reached. In still another method variation of my invention, the starch is made alkaline by suspension in a mild alkali solution, and is then filtered and dried, after which the dry alkaline starch is then mixed with the inhibition agent (with or without further addition of alkali) and allowed to react, preferably with heat. This inhibition reaction may be combined with the heat-conversion of starch, as in the preparation of a British gum, or if desired the starch may first be converted to a British gum or other modification, and then reacted with the inhibiting reagent. The more exact embodiment of these various phases of my invention will become apparent from the following examples in which the "parts" referred to are all taken by weight:

Example I

This example illustrates the wet process reaction of starch, e. g. tapioca starch, with epichlorohydrin. Tapioca starch (100 parts) is added with agitation to a solution of sodium hydroxide (0.8 part) in water (150 parts). To this suspension is added epichlorohydrin (0.05 part) and the reaction is allowed to continue at room temperature, with constant agitation, for fifteen hours. The alkali is then neutralized with dilute mineral acid, the starch filtered, washed several times with water, and dried. The reaction product obtained is an inhibited tapioca starch which upon cooking, in the ratio one part of the modified starch to fifteen parts of water, produces a relatively non-cohesive paste as compared to the cohesive, rubbery mass which would result when untreated tapioca starch is cooked in similar proportions. The addition of several percent of sodium hydroxide to the cooked suspension causes further swelling of the starch granules but does not destroy the non-cohesive character of the paste; neither does prolonged contact with strong alkalis destroy the non-cohesive character of the paste.

Example II

This example illustrates the wet process reaction of epichlorohydrin on starch, e. g. corn starch. The procedure is the same as in Example I except that the starch used is commercial corn starch and the amount of epichlorohydrin is increased to 0.075 part. The resulting reaction product when cooked in the ratio one part of starch to ten parts of water has a considerably lower gel strength than that of untreated corn starch (that is, it does not set to a solid gel upon cooling). The addition of sodium hydroxide to the cooked product produces a very smooth, pasty mass whereas the addition of sodium hydroxide to a cooked untreated corn starch would produce a cohesive, rubbery mass. The treated or reaction product corn starch does not revert to the cohesive state even upon prolonged contact with alkali.

Example III

This example illustrates the wet process reaction of epichlorohydrin with corn starch, to produce a product substantially more inhibited than that obtained in Example II. The procedure is the same as in Example II except that 0.5 part of epichlorohydrin are used. The gel and cohesion of the cooked reaction product is reduced to an even greater extent than in the case of the product of Example II.

Example IV

This example illustrates the wet process reaction of starch with epichlorohydrin to produce a starch which is very highly inhibited. The procedure is the same as in Example I except that the starch used is corn starch, the sodium hydroxide is increased to 2.0 parts, 25 parts of sodium sulfate is added to prevent gelatinization, and the epichlorohydrin is increased to 2.0 parts. This reaction product when cooked in the ratio one part of starch to ten parts of water, at the temperature of a boiling water bath for several hours, shows very little sign of swelling of the granules. On standing, the product will settle out. The addition of sodium hydroxide to the cooked product produces a slight increase in the granule size, but the product nevertheless settles out of the suspension.

This same example when repeated using 20.0 parts of epichlorohydrin*, produces a product which also shows an extremely high degree of inhibition.

Example V

This example illustrates the wet process reaction of corn starch with glycerol dichlorohydrin. The procedure is the same as in Example I except that 2 parts of glycerol dichlorohydrin are used in place of the epichlorohydrin. The product obtained has properties similar to that of Example IV.

Example VI

This example illustrates the dry process reaction of starch with dichloropentanes. Commercially dry corn starch (100 parts) is thoroughly blended with soda ash (8 parts) and a commercial mixture of dichloropentanes (4 parts). The blend is placed in a closed container and maintained at a temperature of 75° to 85° C. for a period of 20 hours. The cooled product can be used as obtained, for commercial operations where the excess soda ash and residual salt are not detrimental. For purification, the product is suspended in water, the alkali neutralized, the starch filtered, washed and dried. This reaction product has properties similar to that obtained in Example II.

Among other alkaline agents which may be used in place of the soda ash are sodium methylate, trisodium phosphate and borax.

Example VII

This example illustrates the dry process reaction of propylene dichloride with starch. Except for the use of propylene dichloride and tapioca starch, the procedure is essentially the same as in Example VI. Commercially dry tapioca starch (100 parts) is blended with soda ash (8 parts) and propylene dichloride (1.5 parts) and the blend maintained at approximately 60° C. for 24 hours. The properties of the purified reaction product are similar to that obtained in Example I.

Example VIII

This example illustrates the dry process reaction of epichlorohydrin with starch. Commercially dry tapioca starch (100 parts) is blended with soda ash (10 parts) and epichlorohydrin (5 parts) and the blend maintained at approximately 60° C. for 24 hours. The purified product has extremely high inhibition, and it shows very little sign of swelling even when cooked with 3% of caustic soda for several hours, the product settling out on standing.

---

* Maintaining the concentration of sodium hydroxide sufficiently high during the reaction so that at no time is there less than one part sodium hydroxide per 100 parts starch.

Example IX

This example illustrates the dry process reaction of ethylene dibromide with starch. Corn starch (100 parts) is blended with soda ash (5 parts) and ethylene dibromide (2 parts) and the blend held at 75° C. for 20 hours. The purified product has properties similar to that described in Example II.

Example X

This example illustrates the dry process treatment of tapioca starch with glycerol dichlorohydrin, wherein the starch has been pre-treated with alkali. Tapioca starch (100 parts) is suspended in 150 parts of water containing 1 part of sodium hydroxide and maintained at room temperature for 4 to 5 hours. After filtering and drying, the starch contains 0.8% of alkali. 100 parts of this dry starch are blended with 0.1 part of glycerol dichlorohydrin (without further addition of alkali) and the mixture kept at approximately 65° C. for 6 hours. The purified product shows a higher degree of inhibition than that described in Example I.

Example XI

This example illustrates a combined dextrinization and inhibition process. Corn starch mixed with 0.5% trisodium phosphate is heated at approximately 400° F. in the standard manner for preparing British gums. When the desired degree of conversion is reached, the heat is turned off, 1% sodium carbonate is added and 0.5% epichlorohydrin is mixed into the batch and allowed to stand for from one-half to one hour. The resultant product is a British gum having the improved properties.

Example XII

A modification of the above Example XI is to take corn starch which has been treated with 0.5% epichlorohydrin, as in Example III, and to convert this, with heat and the addition of about 0.5% trisodium phosphate, to a British gum. The resultant product is also an improved British gum, similar to that obtained by the method of Example XI.

Example XIII

This example illustrates the dry process treatment of corn starch with 1,4 dichlorobutane, wherein the starch has been pre-treated with alkali. Corn starch (100 parts) which has been pre-treated with alkali, as described in Example X, is blended with sodium methylate (5 parts) and 1,4 dichlorobutane (5 parts). The blend is heated in a sealed container at 40–50° C. for 24 hours and the product is then purified as previously described. In this example, the 1,4 dichlorobutane is the reaction agent, the sodium methylate merely serving as additional alkali. The resulting material is highly inhibited.

Example XIV

This example illustrates the wet process reaction of an acid converted corn starch with epichlorohydrin. The procedure is the same as that described in Example I except that the starch is a commercial 60 fluidity acid converted corn starch and the quantity of epichlorohydrin is 0.1 part. The product exhibits a low degree of inhibition. If in this procedure the epichlorohydrin is increased to 2.0 parts, the product exhibits a very high degree of inhibition.

Example XV

This example illustrates the wet process reaction of a hypochlorite converted corn starch with epichlorohydrin. The procedure is the same as in Example I except that the starch is a commercial 40 fluidity chlorinated corn starch and the quantity of epichlorohydrin is 0.1 part. The resulting product exhibits a low degree of inhibition.

The modified starch produced is in the physical form of starch granules having the property of inhibited gelatinization when dispersed with water under normal gelatinization conditions. The chemical reaction involved is believed to consist in the linkage of two groups of the inhibition reagent with two hydroxyl groups of a starch molecule or with one hydroxyl group on each of two starch molecules. This blocking or bridging of the hydroxyl groups on the surface of the starch granule probably causes the inhibition; that is, it tends to retard the swelling and bursting of the granule.

As stated, the range of the reaction is very great. By varying the type and quantity of the reagent and the period of reaction, I can produce starch products ranging from one which is only slightly inhibited to one which is so highly inhibited that it will not form a paste even upon cooking in strong alkali. The reaction takes place upon any of the raw starches, such as corn, tapioca, sago, potato, wheat, waxy maize, sweet potato or rice, or upon any of the various types of modified or converted starches, the only condition being that the starch is not to be in the gelatinized state at the time of the reaction. The inhibited starch produced by my process may be subjected to any of the known methods of starch conversion or modification, such as dextrinization, oxidation, etc.

The degree of inhibition is dependent upon the nature and quantity of the inhibition reagent employed, and upon the period of reaction. Ordinarily, the degree of inhibition will increase as the quantity of reagent and the time of reaction is increased. Similarly, in the dry process, the application of heat accelerates the reaction. Since the range of the reaction is so great, with useful products at all points of the range, it is not feasible to set specific limits on the quantities of the reactants. This is particularly so because of the large number of possible inhibiting reagents, as well as the many varieties of starches, temperatures, degrees of alkalinity and similar variables. However, the principle and method of my invention have, it is believed, been clearly set forth, and the various modifications within the scope of the invention will be apparent to those skilled in the art.

The products of my invention, because of their distinctive, smooth, relatively non-cohesive character, are of great commercial value. Thus, they are used in foods—as in salad dressings, puddings, and pies. They are also of value in printing gums for the textile industry, particularly because their smooth, non-cohesive character is not adversely affected by the alkalis present in certain textile printing operations. Other uses will become apparent from the description of the qualities of the inhibited starch products, which has been given herein.

I claim:

1. A modified starch in the physical form of ungelatinized starch granules having the property of inhibited gelatinization when dispersed in water under normal gelatinization conditions, comprising the product of chemical reaction of ungelatinized starch, under conditions which do not effect gelatinization of the starch, and an ether forming reagent containing at least two functional groups which form ether linkages with at least two hydroxyl groups of the starch molecules.

2. A modified starch in the physical form of ungelatinized starch granules having the property of inhibited gelatinization when dispersed in water under normal gelatinization conditions, comprising the product of chemical reaction of ungelatinized starch, under conditions which do not effect gelatinization of the starch, and an ether forming aliphatic dihalide, in which the two halogens of the organic aliphatic dihalide form ether linkages with two hydroxyl groups of the starch molecules.

3. A modified starch in the physical form of ungelatinized starch granules having the property of inhibited gelatinization when dispersed in water under normal gelatinization conditions, comprising the product of chemical reaction of ungelatinized starch, under conditions which do not effect gelatinization of the starch, and an epoxy halogen compound, in which the halogen and the epoxy group of the epoxy halogen compound form ether linkages with two hydroxyl groups of the starch molecules.

4. A modified starch in the physical form of ungelatinized starch granules having the property of inhibited gelatinization when dispersed in water under normal gelatinization conditions, comprising the product of chemical reaction of ungelatinized starch, under conditions which do not effect gelatinization of the starch, and epichlorohydrin, in which the two functional groups of the epichlorohydrin form ether linkages with two hydroxyl groups of the starch molecules.

5. A modified starch in the physical form of ungelatinized starch granules having the property of inhibited gelatinization when dispersed in water under normal gelatinization conditions, comprising the product of chemical reaction of ungelatinized starch, under conditions which do not effect gelatinization of the starch, and glycerol dichlorohydrin, in which the two functional groups of the glycerol dichlorohydrin form ether linkages with two hydroxyl groups of the starch molecules.

6. A modified starch in the physical form of ungelatinized starch granules having the property of inhibited gelatinization when dispersed in water under normal gelatinization conditions, comprising the product of chemical reaction of ungelatinized starch, under conditions which do not effect gelatinization of the starch, and dichloropentane, in which the two functional groups of the dichloropentane form ether linkages with two hydroxyl groups of the starch molecules.

7. The method which consists in reacting ungelatinized starch with an ether forming reagent in the presence of an alkaline medium, under conditions which do not effect gelatinization of the starch, said ether forming reagent containing at least two functional groups which form ether linkages with at least two hydroxyl groups of the starch molecules, and thereby producing a modified starch in the physical form of ungelatinized starch granules having the property of inhibited gelatinization when dispersed in water under normal gelatinization conditions.

8. The method of claim 7 in which the ether forming reagent is an organic aliphatic dihalide.

9. The method of claim 7 in which the ether forming reagent is an epoxy halogen compound.

10. The method of claim 7 in which the ether forming reagent is epichlorohydrin.

11. The method of claim 7 in which the ether forming reagent is glycerol dichlorohydrin.

MOSES KONIGSBERG.

REFERENCES CITED

The following references are of record in the file of this patent:

UNITED STATES PATENTS

| Number | Name | Date |
|---|---|---|
| 1,805,365 | Huber | May 12, 1931 |
| 2,116,867 | Kreimeier et al. | May 10, 1938 |
| 2,148,951 | Maxwell | Feb. 28, 1939 |